(12) United States Patent
Wu et al.

(10) Patent No.: US 6,640,006 B2
(45) Date of Patent: Oct. 28, 2003

(54) WORD SEGMENTATION IN CHINESE TEXT

(75) Inventors: Andi Wu, Bellevue, WA (US); Stephen D. Richardson, Redmond, WA (US); Zixin Jiang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/087,468

(22) Filed: May 29, 1998

(65) Prior Publication Data

US 2002/0102025 A1 Aug. 1, 2002

Related U.S. Application Data

(63) Continuation-in-part of application No. 09/023,586, filed on Feb. 13, 1998, now abandoned.

(51) Int. Cl.[7] .................................................. G06K 9/34
(52) U.S. Cl. ...................................... 382/177; 382/185
(58) Field of Search ................................ 382/177, 185, 382/229–231, 178, 179; 704/9, 257

(56) References Cited

U.S. PATENT DOCUMENTS

| | | | |
|---|---|---|---|
| 3,969,700 A | 7/1976 | Bollinger et al. | 340/146.3 |
| 4,750,122 A | 6/1988 | Kaji et al. | 364/419 |
| 4,850,026 A | 7/1989 | Jeng et al. | 382/185 |
| 4,942,526 A * | 7/1990 | Okajima et al. | 382/177 |
| 5,077,804 A | 12/1991 | Richard | 382/7 |
| 5,299,125 A | 3/1994 | Baker et al. | 364/419.08 |
| 5,448,474 A | 9/1995 | Zamora | 364/419.1 |
| 5,454,046 A | 9/1995 | Carman, II | 382/187 |
| 5,694,523 A | 12/1997 | Wical | 395/12 |
| 5,787,197 A | 7/1998 | Beigi et al. | 382/187 |
| 5,806,021 A | 9/1998 | Chen et al. | 704/9 |
| 5,850,480 A | 12/1998 | Scanlon | 382/187 |
| 5,917,941 A * | 6/1999 | Webb et al. | 382/177 |
| 5,923,778 A | 7/1999 | Chen et al. | 382/187 |
| 5,933,525 A | 8/1999 | Makhoul et al. | 382/185 |
| 5,940,532 A | 8/1999 | Tanaka | 382/187 |
| 6,014,615 A | 1/2000 | Chen | 704/3 |

FOREIGN PATENT DOCUMENTS

| | | |
|---|---|---|
| CN | 94112998.5 | 12/1995 |
| WO | WO 98/08169 | 2/1998 |
| WO | WO 99/62001 | 12/1999 |

OTHER PUBLICATIONS

Chen et al., "Word Identification for Mandarin Chinese Sentences", Proceedings of the 14th International Conference on Computational Linguistics (Coling '92), pp. 101–107, Nantes, France.

(List continued on next page.)

*Primary Examiner*—Yon J. Couso
(74) *Attorney, Agent, or Firm*—Westman, Champlin & Kelly, P.A.; S. Koehler

(57) ABSTRACT

The present invention provides a facility for selecting from a sequence of natural language characters combinations of characters that may be words. The facility uses indications, for each of a plurality of characters, of (a) the characters that occur in the second position of words that begin with the character and (b) the positions in which the character occurs in words. For each of a plurality of contiguous combinations of characters occurring in the sequence, the facility determines whether the character occurring in the second position of the combination is indicated to occur in words that begin with the character occurring in the first position of the combination. If so, the facility determines whether every character of the combination is indicated to occur in words in a position in which it occurs in the combination. If so, the facility determines that the combination of characters may be a word. In some embodiments, the facility proceeds to compare the combination of characters to a list of valid words to determine whether the combination of characters is a word.

41 Claims, 12 Drawing Sheets

OTHER PUBLICATIONS

Wu et al., "Chinese Text Segmentation for Text Retrieval: Achievements and Problems", Journal of the American Society for Information Science, 44(9) :532–542, 1993.

Chang et al., "A Multiple–Corpus Approach to Recognition of Proper Names in Chinese Texts", Computer Processing of Chinese and Oriental Languages, vol. 8, No. 1, Jun. 1994, pp. 75–85.

Sproat et al., "A Stochastic Finite–State Word Segmentation Algorithm for Chinese", Computational Linguistics, vol. 22, No. 3, pp. 377–404, 1996.

Gan et al., "A Statistically Emergent Approach for Language Processing: Application to Modeling Context Effects in Ambiguous Chinese Word Boundary Perception", Computational Linguistics, vol. 22, No. 4, pp. 531–553, 1996.

Guo, J., "Critical Tokenization and its Properties", Computational Linguistics, vol. 23, No. 4, pp. 569–596, 1997.

Yuan et al., "Splitting–Merging Model for Chinese Word Tokenization and Segmentation", Department of Information Systems & Computer Sciences, National University of Singapore. No date.

Xiaohong Huang et al., "A Quick Method for Chinese Word Segmentation", IEEE Conf. on Intelligent Processing Systems, Oct. 28–31, 1997, pp 1773–1776.

Charng–Kang Fan and Wen–Hsiang Tsai, "Automatic Word Identification in Chinese Sentences by the Relaxation Technique", Computer Processing of Chinese and Oriental Languages, vol. 4, No. 1, Nov. 1988, pp 33–56.

"Automatic Recognition of Person Names Based On Corpus and Rule–Base" (English translation is provided), taken from Phrases, Articles and Tools (A Collection of Theses of Chinese Information Processing) 1991–1998 The Artificial Intelligence Lab of Beijing Computer Institute Nov. 1998.

Coates–Stephens, "The Analysis and Acquisition of Proper Names for the Understanding of Free Text", Computers and the Humanities, vol. 26, 441–456, 1993.

Yhap, et al. "An On–Line Chinese Character Recognition System", IBM J. Res. Develop., vol. 25, No. 3, pp. 187–189, May 1991.

Coates–Stephens, "The Analysis and Acquisition of Proper Names for Robust Text Understanding", Dept. of Computer Science, City University London, England, pp. 1–8, 113–133 and 200–206, Oct. 1992.

"Rule–Based Word Identification for Mandarin Chinese Setences—A Unification Approach" by Ching–Long Yeh and Hsi–Jian Lee, for *Computer Processing of Chinese & Oriental Languages*, vol. 5, No. 2, Mar. 1991.

"Unknown Word Detection and Segmentation of Chinese Using Statistical and Heuristic Knowledge" by Jian–Yun Nie et al., for *Communications of COLIPS*, vol. 5, Nos. 1 & 2, Dec. 1995, pp. 47–57.

"A Probabilistic Algorithm for Segmenting Non–Kanji Japanese Strings" by Virgina Teller and Eleanor Olds Batchelder, for Natural Language Processing, Jul. 31, 1994.

"Method of Segmenting Texts into Words" for *IBM Technical Disclosure Bulletin*, vol. 39, No. 11, pp. 115–118, Nov. 1996.

* cited by examiner

WORD SEGMENTATION IN CHINESE TEXT

CROSS REFERENCE TO RELATED APPLICATION

This application is a continuation-in-part application of application Ser. No. 09/023,586 filed Feb. 13, 1998 now abandoned, the content of which is incorporated herein in its entirety.

TECHNICAL FIELD

The invention relates generally to the field of natural language processing, and, more specifically, to the field of word segmentation.

BACKGROUND OF THE INVENTION

Word segmentation refers to the process of identifying the individual words that make up an expression of language, such as text. Word segmentation is useful for checking spelling and grammar, synthesizing speech from text, and performing natural language parsing and understanding, all of which benefit from an identification of individual words.

Performing word segmentation of English text is rather straightforward, since spaces and punctuation marks generally delimit the individual words in the text. Consider the English sentence in Table 1 below.

TABLE 1

The motion was then tabled--that is, removed indefinitely from consideration.

By identifying each contiguous sequence of spaces and/or punctuation marks as the end of the word preceding the sequence, the English sentence in Table 1 may be straightforwardly segmented as shown in Table 2 below.

TABLE 2

The motion was then tabled -- that is, removed indefinitely from consideration.

In Chinese text, word boundaries are implicit rather than explicit. Consider the sentence in Table 3 below, meaning "The committee discussed this problem yesterday afternoon in Buenos Aires."

TABLE 3

昨天下午委员会在布宜诺斯艾利斯讨论了这个问题。

Despite the absence of punctuation and spaces from the sentence, a reader of Chinese would recognize the sentence in Table 3 as being comprised of the words separately underlined in Table 4 below.

TABLE 4

昨天 下午 委员会 在 布宜诺斯艾利斯 讨论 了 这个 问题。

It can be seen from the examples above that Chinese word segmentation cannot be performed in the same manner as English word segmentation. An accurate and efficient approach to automatically performing Chinese segmentation would nonetheless have significant utility.

SUMMARY OF THE INVENTION

In accordance with the invention, a word segmentation software facility ("the facility") provides word segmentation services for text in unsegmented languages such as Chinese by (1) evaluating the possible combinations of characters in an input sentence and discarding those unlikely to represent words in the input sentence, (2) looking up the remaining combinations of characters in a dictionary to determine whether they may constitute words, and (3) submitting the combinations of characters determined to be words to a natural language parser as alternative lexical records representing the input sentence. The parser generates a syntactic parse tree representing the syntactic structure of the input sentence, which contains only those lexical records representing the combinations of characters certified to be words in the input sentence. When submitting the lexical records to the parser, the facility weights the lexical records so that longer combinations of characters, which more commonly represent the correct segmentation of a sentence than shorter combinations of characters, are considered by the parser before shorter combinations of characters.

In order to facilitate discarding combinations of characters unlikely to represent words in the input sentence, the facility adds to the dictionary, for each character occurring in the dictionary, (1) indications of all of the different combinations of word length and character position in which the word appears, and (2) indications of all of the characters that may follow this character when this character begins a word. The facility further adds (3) indications to multiple-character words of whether sub-words within the multiple-character words are viable and should be considered. In processing a sentence, the facility discards (1) combinations of characters in which any character is used in a word length/position combination not occurring in the dictionary, and (2) combinations of characters in which the second character is not listed as a possible second character of the first character. The facility further discards (3) combinations of characters occurring in a word for which sub-words are not to be considered.

In this manner, the facility both minimizes the number of character combinations looked up in the dictionary and utilizes the syntactic context of the sentence to differentiate between alternative segmentation results that are each comprised of valid words.

DETAILED DESCRIPTION OF THE INVENTION

The present invention provides word segmentation in Chinese text. In a preferred embodiment, a word segmentation software facility ("the facility") provides word segmentation for text in unsegmented languages such as Chinese by (1) evaluating the possible combinations of characters in an input sentence and discarding those unlikely to represent words in the input sentence, (2) looking up the remaining combinations of characters in a dictionary to determine whether they may constitute words, and (3) submitting the combinations of characters determined to be words to a natural language parser as alternative lexical records representing the input sentence. The parser generates a syntactic parse tree representing the syntactic structure of the input sentence, which contains only those lexical records representing the combinations of characters certified to be words in the input sentence. When submitting the lexical records to the parser, the facility weights the lexical records so that longer combinations of characters, which more commonly represent the correct segmentation of a sentence than shorter combinations of characters, are considered by the parser before shorter combinations of characters.

In order to facilitate discarding combinations of characters unlikely to represent words in the input sentence, the facility adds to the dictionary, for each character occurring in the dictionary, (1) indications of all of the different combinations of word length and character position in which the word appears, and (2) indications of all of the characters that may follow this character when this character begins a word. The facility further adds (3) indications to multiple-character words of whether sub-words within the multiple-character words are viable and should be considered. In processing a sentence, the facility discards (1) combinations of characters in which any character is used in a word length/position combination not occurring in the dictionary, and (2) combinations of characters in which the second character is not listed as a possible second character of the first character. The facility further discards (3) combinations of characters occurring in a word for which sub-words are not to be considered.

In this manner, the facility both minimizes the number of character combinations looked up in the dictionary and utilizes the syntactic context of the sentence to differentiate between alternative segmentation results that are each comprised of valid words.

Figure 1:
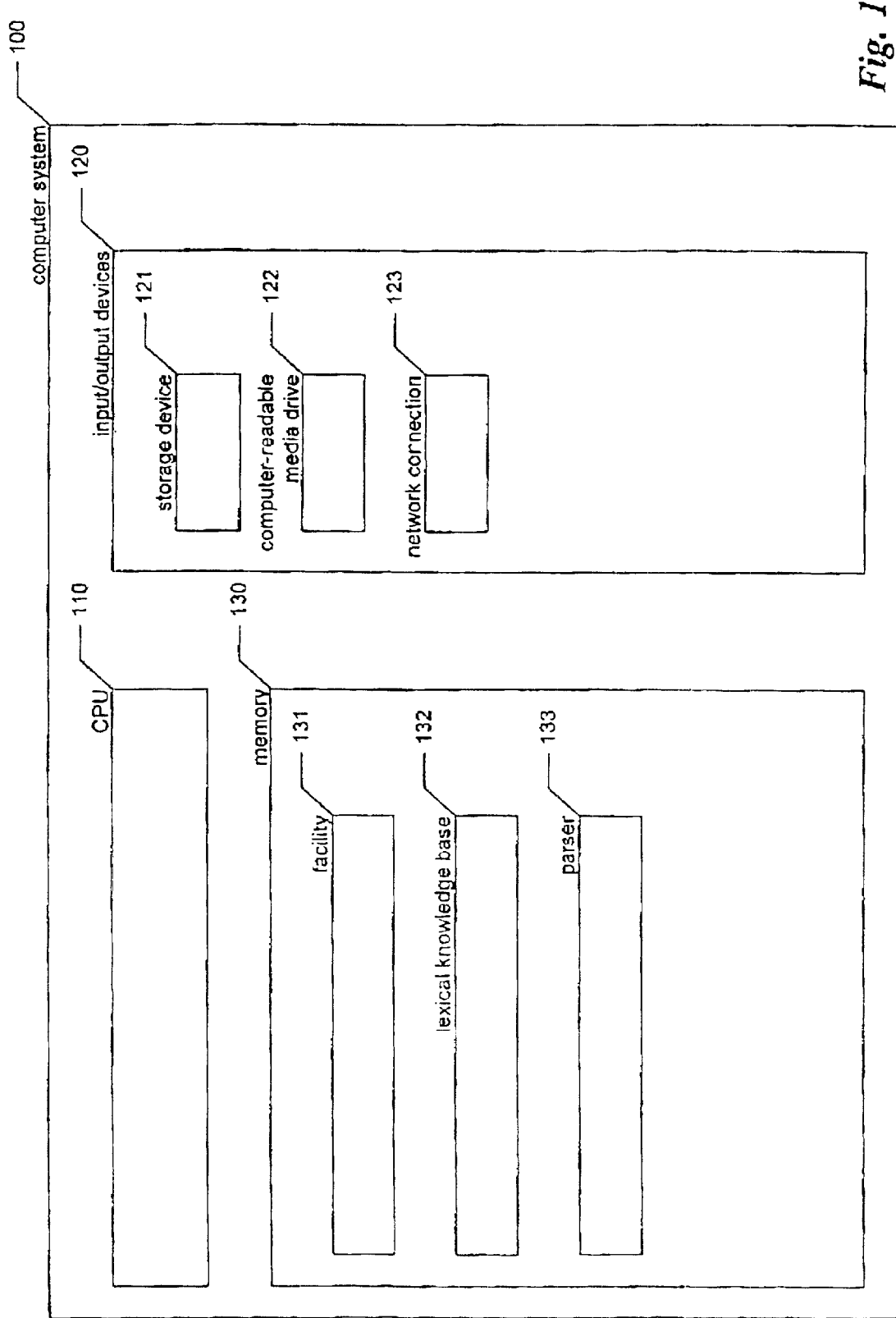
FIG. 1 is a high-level block diagram of the general-purpose computer system upon which the facility preferably executes.

FIG. 1 is a high-level block diagram of the general-purpose computer system upon which the facility preferably executes. The computer system 100 contains a central processing unit (CPU) 110, input/output devices 120, and a computer memory (memory) 130. Among the input/output devices is a storage device 121) such as a hard disk drive; a computer-readable media drive 122, which can be used to install software products, including the facility, which are provided on a computer-readable medium, such as a CD-ROM; and a network connection 123, through which the computer system 100 may communicate with other connected computer systems (not shown). The memory 130 preferably contains a word segmentation facility 131 for identifying individual words occurring in Chinese text, a syntactic parser 133 for generating a parse tree representing the syntactic structure of a sentence of natural language text from lexical records representing the words occurring in the natural language text, and a lexical knowledge base 132 for use by the parser in constructing lexical records for a parse tree and for use by the facility to identify words occurring in natural language text. While the facility is preferably implemented on a computer system configured as described above, those skilled in the art will recognize that it may also be implemented on computer systems having different configurations.

Figure 2:
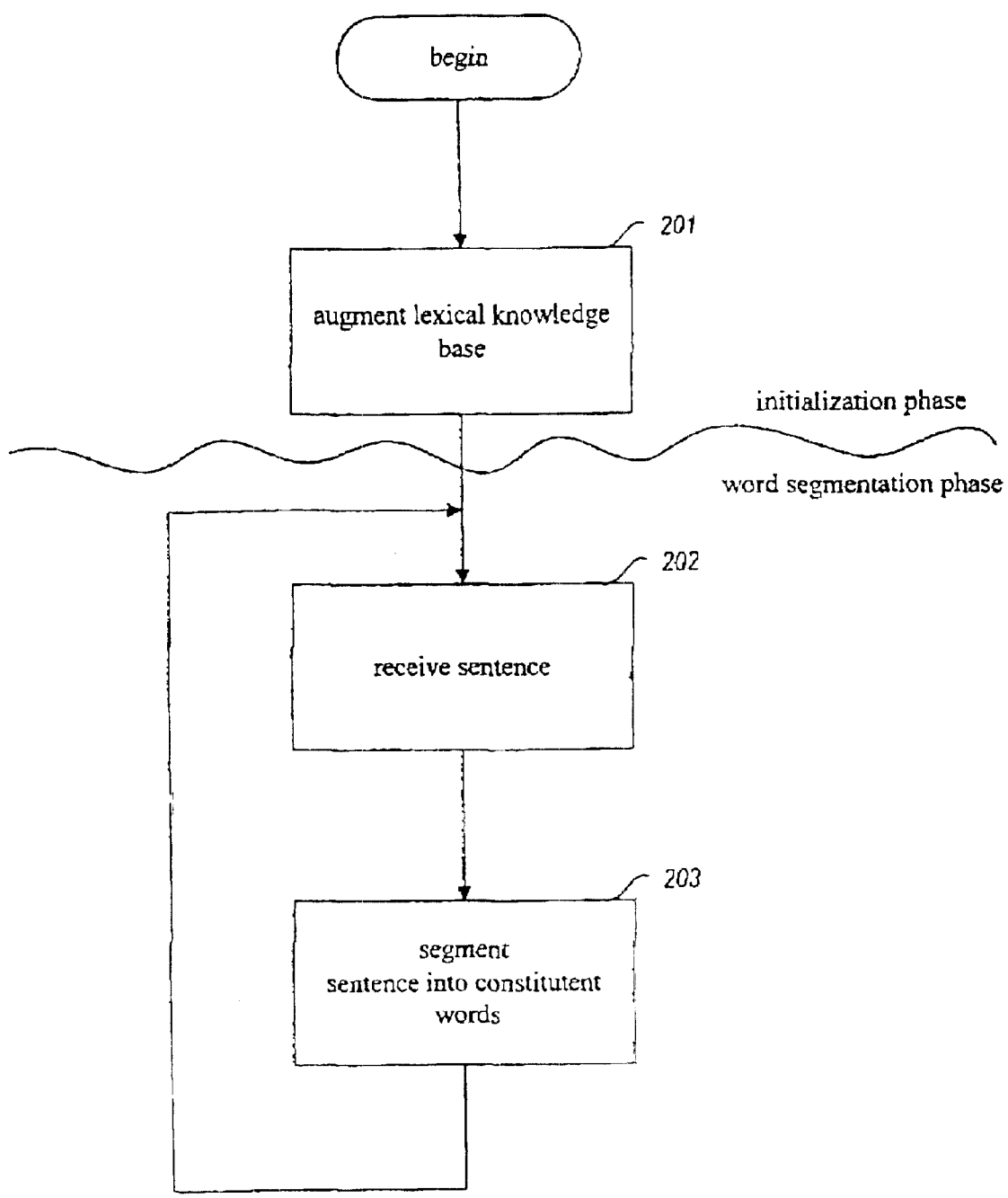
FIG. 2 is an overview flow diagram showing the two phases in which the facility preferably operates.

FIG. 2 is an overview flow diagram showing the two phases in which the facility preferably operates. In step 201, as part of an initialization phase, the facility augments a lexical knowledge base to include information used by the facility to perform word segmentation. Step 201 is discussed in greater detail below in conjunction with FIG. 3. Briefly, in step 201, the facility adds entries to the lexical knowledge base for the characters occurring in any word in the lexical knowledge base. The entry added for each character includes a CharPos attribute that indicates the different positions at which the character appears in words. The entry for each character further contains a NextChars attribute that indicates the set of characters that occur in the second position of words that begin with the current character. Finally, the facility also adds an IgnoreParts attribute to each word occurring in the lexical knowledge base that indicates whether the sequence of characters comprising the word should ever be considered to comprise smaller words that together make up the current word.

After step 201, the facility continues in step 202, ending the initialization phase and beginning the word segmentation phase. In the word segmentation phase, the facility uses the information added to the lexical knowledge base to perform word segmentation of sentences of Chinese text. In step 202, the facility receives a sentence of Chinese text for word segmentation. In step 203, the facility segments the received sentence into its constituent words. Step 203 is discussed in greater detail below in conjunction with FIG. 5. Briefly, the facility looks up in the lexical knowledge base a small fraction of all the possible contiguous combinations of characters in the sentence. The facility then submits to a syntactic parser the looked-up combinations of characters that are indicated to be words by the lexical knowledge base. The parser, in determining the syntactic structure of the sentence, identifies the combinations of characters intended to comprise words in the sentence by its author. After step 203, the facility continues at step 202 to receive the next sentence for word segmentation.

Figure 3:
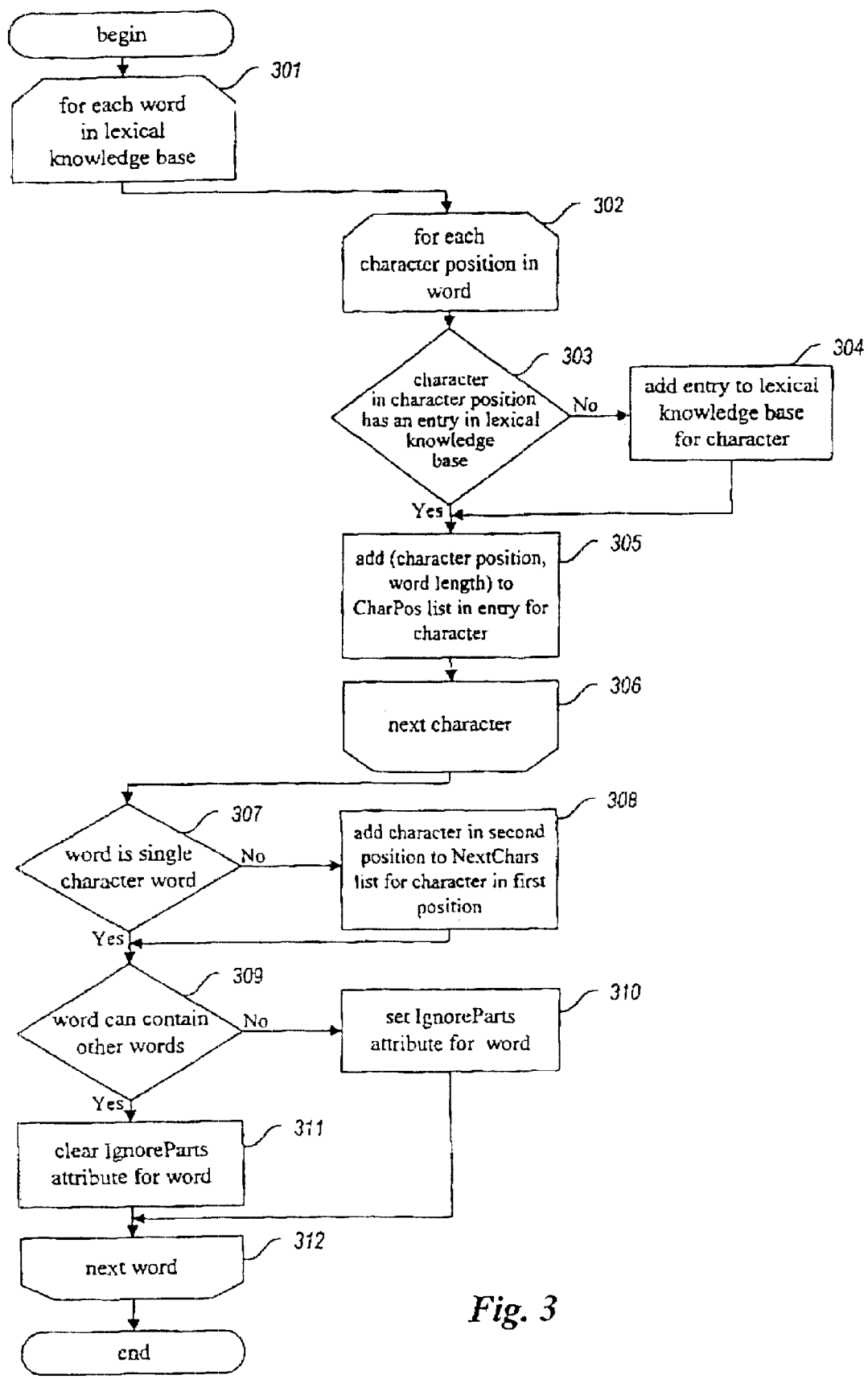
FIG. 3 is a flow diagram showing the steps preferably performed by the facility in order to augment the lexical knowledge base in the initialization phase to include information used to perform word segmentation.

FIG. 3 is a flow diagram showing the steps preferably performed by the facility in order to augment the lexical knowledge base in the initialization phase to include information used to perform word segmentation. These steps (a) add entries to the lexical knowledge base for the characters occurring in words in the lexical Knowledge base; (b) add CharPos and NextChars attributes to the character entries in the lexical knowledge base, (c) add the IgnoreParts attribute to the entries for words in the lexical knowledge base.

In steps 301–312, the facility loops through each word entry in the lexical knowledge base. In step 302, the facility loops through each character position in the word. That is, for a word containing three characters, the facility loops through the first, second, and third characters of the word. In step 303, if the character in the current character position has an entry in the lexical knowledge base, then the facility continues in step 305, else the facility continues in step 304. In step 304 the facility adds an entry to the lexical knowledge base for the current character. After step 304, the facility continues in step 305. In step 305, the facility adds an ordered pair to the CharPos attribute stored in the character's entry in the lexical knowledge base to indicate that the character may occur in the position in which it occurs in the current word. The ordered pair added has the form (position, length), where position is the position that the character occupies in the word and length is the number of characters in the word. For example, for the character "委" in the word "委, 委员会, 委员会," the facility will add the ordered pair (1, 3) to the list of ordered pairs stored in the CharPos attribute in the lexical knowledge base entry for the character "委." The facility preferably does not add the ordered pair as described in step 305 if the ordered pair is already contained in the CharPos attribute for the current word. In step 306, if additional characters remain in the current word to be processed, then the facility continues in step 302 to process the next character, else the facility continues in step 307.

In step 307, if the word is a single character word, then the facility continues in step 309, else the facility continues in step 308. In step 308, the facility adds a character in the second position of the current word to the list of characters in the NextChars attribute in the lexical knowledge base record for the character in the first position of the current word. For example, for the word "委, 委员会, 委员会," the facility adds the character "委员会" to the list of characters stored for the NextChars attribute of the character "委." After step 308, the facility continues in step 309.

In step 309, if the current word can contain other, smaller words, then the facility continues in step 311, else the facility continues in step 310. Step 309 is discussed in further detail below in conjunction with FIG. 4. Briefly, the facility employs a number of heuristics to determine whether an occurrence of the sequence of characters that make up the current word may in some context make up two or more smaller words, In step 310, the facility sets an IgnoreParts attribute for the word in the lexical knowledge base entry for the word. Setting the IgnoreParts attribute indicates that, when the facility encounters this word in a sentence of input text, it should not perform further steps to determine whether this word contains smaller words. After step 310, the facility continues in step 312. In step 311, because the current word can contain other words, the facility clears the IgnoreParts attribute for the word, so that the facility, when it encounters the word in a sentence of input text, proceeds to investigate whether the word contains smaller words. After step 311, the facility continues in step 312. In step 312, if additional words remain in the lexical knowledge base to be processed, then the facility continues in step 301 to process the next word, else these steps conclude.

When the facility performs the steps shown in FIG. 3 to augment the lexical knowledge base by assigning CharPos and NextChars attributes to each character, it assigns these attributes to the characters occurring in the sample sentence shown in Table 3 as shown below in Table 5.

TABLE 5

| Character Lexical Knowledge Base Entries | | |
|---|---|---|
| Character | CharPos | NextChars |
| 昨 | (1,2) (1,3) (3,4) | 儿 天 晚 |
| 天 | (1,2) (2,2) (1,3) (2,3) (3,3) (1,4) (2,4) (3,4) (4,4) | 安 崩 兵 … |
| 下 | (1,2) (2,2) (1,3) (2,3) (3,3) (1,4) (2,4) (3,4) (4,4) | 巴 百 班 … 午 … |
| 午 | (1,2) (2,2) (2,3) (2,4) | 餐 饭 后 … |
| 委 | (1,2) (2,2) (1,3) (2,3) (3,3) (1,4) (3,4) (4,4) (3,5) | 廊 派 屈 … 员 … |
| 员 | (1,2) (2,2) (2,3) (3,3) (2,4) (3,4) (4,4) | 额 工 司 外 |
| 会 | (1,2) (2,2) (1,3) (2,3) (3,3) (1,4) (2,4) (3,4) (4,4) (4,5) | 标 餐 操 … |
| 在 | (1,2) (2,2) (1,3) (2,3) (1,4) (2,4) (3,4) (4,4) | 柴 场 朝 … |
| 布 | (1,2) (2,2) (1,3) (2,3) (3,3) (1,4) (2,4) (3,4) (4,4) (1,5) (2,5) (3,5) (4,5) (1,6) (2,6) (1,7) | 达 店 丁 … 官 … |
| 宜 | (1,2) (2,2) (2,3) (3,3) (2,4) (3,4) (4,4) (3,6) (2,7) | 宾 昌 诚 … |
| 诺 | (1,2) (2,2) (1,3) (2,3) (3,3) (2,4) (3,4) (4,4) (3,7) | 贝 丁 曼 萨 言 |
| 斯 | (1,2) (2,2) (1,3) (2,3) (3,3) (1,4) (2,4) (3,4) (4,4) (1,5) (2,5) (3,5) (4,5) (5,5) (1,6) (3,6) (4,6) (5,6) (6,6) (4,7) (5,7) (6,7) (7,7) | 文 德 拉 … |
| 艾 | (1,2) (2,2) (1,3) (3,4) (4,4) (1,5) (5,7) | 比 丁 黎 … |
| 利 | (1,2) (2,2) (1,3) (2,3) (3,3) (1,4) (2,4) (3,4) (4,4) (2,5) (3,5) (4,5) (5,6) (6,7) | 薄 比 弊 … |
| 斯 | (1,2) (2,2) (1,3) (2,3) (3,3) (1,4) (2,4) (3,4) (4,4) (1,5) (2,5) (3,5) (4,5) (5,5) (1,6) (3,6) (4,6) (5,6) (6,6) (4,7) (5,7) (6,7) (7,7) | 文 德 拉 … |
| 讨 | (1,2) (2,2) (1,3) (2,3) (1,4) (2,4) | 伐 饭 好 价 叫 论 人 厌 |
| 论 | (1,2) (2,2) (1,3) (2,3) (3,3) (1,4) (2,4) (3,4) (4,4) | 处 点 调 … |
| 了 | (1,2) (2,2) (1,3) (3,3) (1,4) (2,4) (3,4) (4,4) | 不 结 解 … |
| 这 | (1,2) (1,3) (1,4) | 边 儿 个 … |
| 个 | (1,2) (2,2) (1,3) (2,3) (3,3) (1,4) (2,4) | 别 儿 旧 … |
| 问 | (1,2) (2,2) (1,3) (2,3) (1,4) (3,4) (4,4) | 长 答 道 … 题 … |
| 题 | (1,2) (2,2) (2,3) (3,3) (2,4) (4,4) | 跋 材 词 … |

It can be seen from Table 5, for instance, from the CharPos attribute of the character "员" that this character can appear as the first character of words that are 2, 3, or 4 characters long. It can further be seen from the NextChars attribute of the character "员" that, in words beginning with this character, the second character may be either "昨," "儿," or "天."

Figure 4:
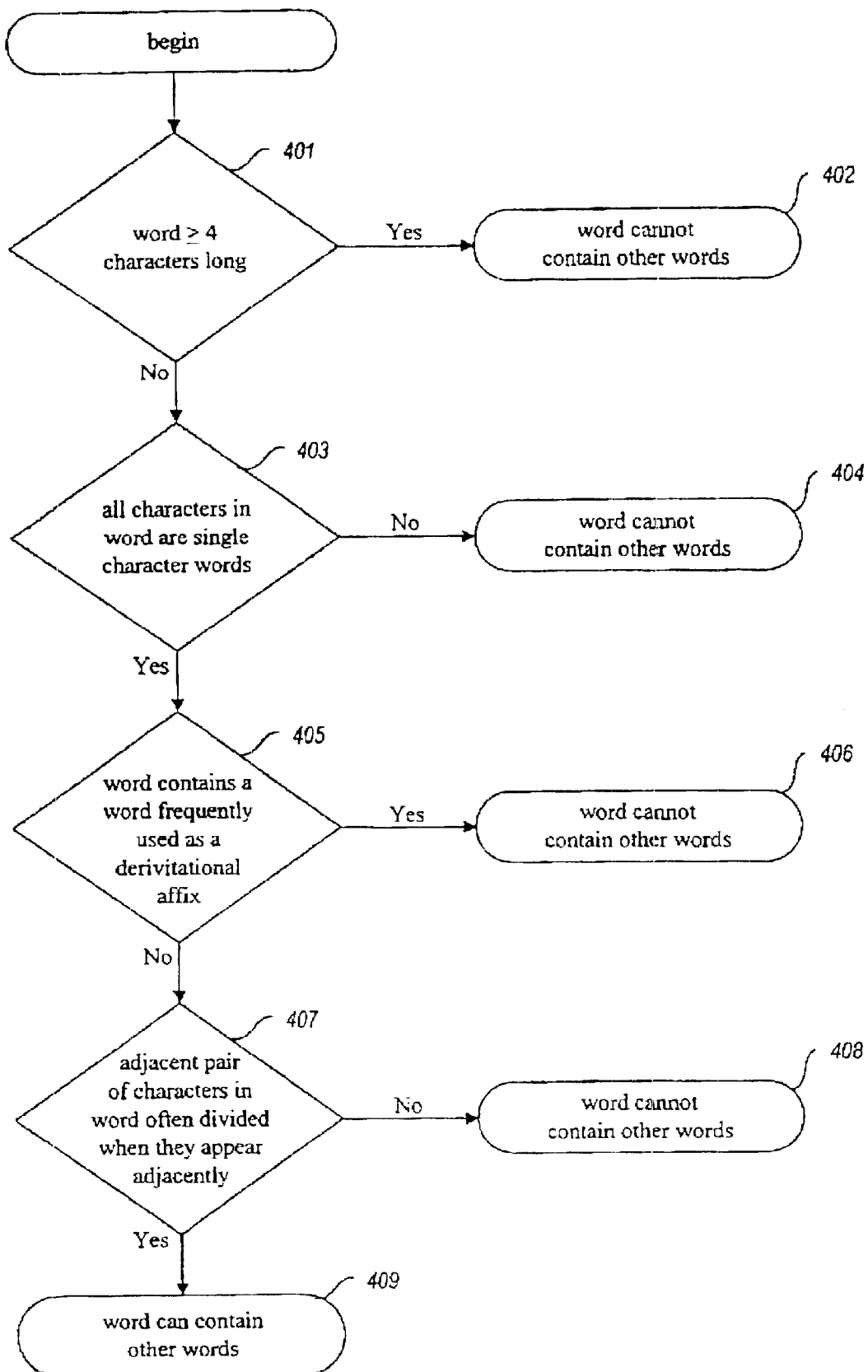
FIG. 4 is a flow diagram showing the steps preferably performed in order to determine whether a particular word can contain other, smaller words.

FIG. 4 is a flow diagram showing the steps preferably performed in order to determine whether a particular word can contain other, smaller words. As an analogy to English, if spaces and punctuation characters were removed from an English sentence, the sequence of characters "beat" could be interpreted either as the word "beat" or as the two words "be" and "at." In step 401, if the word contains four or more characters, then the facility continues in step 402 to return the result that the word cannot contain other words, else the facility continues in step 403. In step 403, if all the characters in the word can constitute single-character words, then the facility continues in step 405, else the facility continues in step 404 to return the result that the word cannot contain other words. In step 405, if the word contains a word frequently used as a derivational affix, that is, a prefix or a suffix, then the facility continues in step 406 to return the result that the word cannot contain other words, else the facility continues in step 407. In step 407, if an adjacent pair of characters in the word are often divided when they appear adjacently in text of the language, then the facility continues in step 409 to return the result that the word can contain other words, else the facility continues in step 408 to return the result that the word cannot contain other words.

The results of determining whether particular words can contain other, smaller words are shown below in Table 6.

TABLE 6

Word Lexical Knowledge Base Entries

| Word | IgnoreParts |
| --- | --- |
| 昨天 | set |
| 天下 | clear |
| 下午 | set |
| 委员会 | clear |
| 委员 | set |
| 布宜诺斯艾利斯 | set |
| 讨论 | set |
| 这个 | clear |
| 问题 | set |

For example, it can be seen from Table 6 that the facility has determined that the word "员, 儿" cannot contain other words, while the word "儿, 晚" may contain other words.

Figure 5:
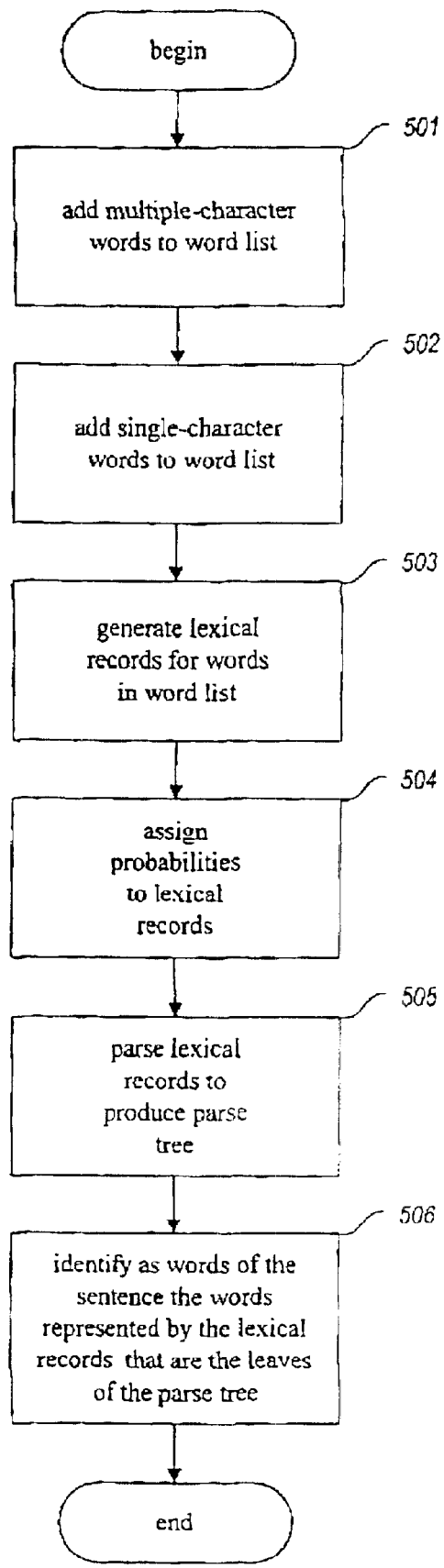
FIG. 5 is a flow diagram of the steps preferably Performed by the facility in order to segment a sentence into its constituent words.

FIG. 5 is a flow diagram of the steps preferably performed by the facility in order to segment a sentence into its constituent words. These steps generate a word list identifying different words of the language that occur in the sentence. The word list is then submitted to a parser to identify the subset of words in the word list that were intended to comprise the sentence by its author.

In step 501, the facility adds to the word list multiple-character words occurring in the sentence. Step 501 is discussed in greater detail below in conjunction with FIG. 6. In step 502, the facility adds to the word list the single-character words occurring in the sentence. Step 502 is discussed in greater detail below in conjunction with FIG. 9. In step 503, the facility generates lexical records used by the lexical parser for the words that have been added to the word list in steps 501 and 502. In step 504, the facility assigns probabilities to the lexical records. The probability of a lexical record reflects the likelihood that the lexical record will be part of a correct parse tree for the sentence, and is used by the parser to order the application of the lexical records in the parsing process. The parser applies the lexical records during the parsing process in decreasing order of their probabilities. Step 504 is discussed in greater detail below in conjunction with FIG. 10. In step 505, the facility utilizes the syntactic parser to parse the lexical records in order to produce a parse tree reflecting the syntactic structure of the sentence. This parse tree has a subset of the lexical records generated in step 503 as its leaves. In step 506, the facility identifies as words of the sentence the words represented by the lexical records that are the leaves of the parse tree. After step 506, these steps conclude.

Figure 6:
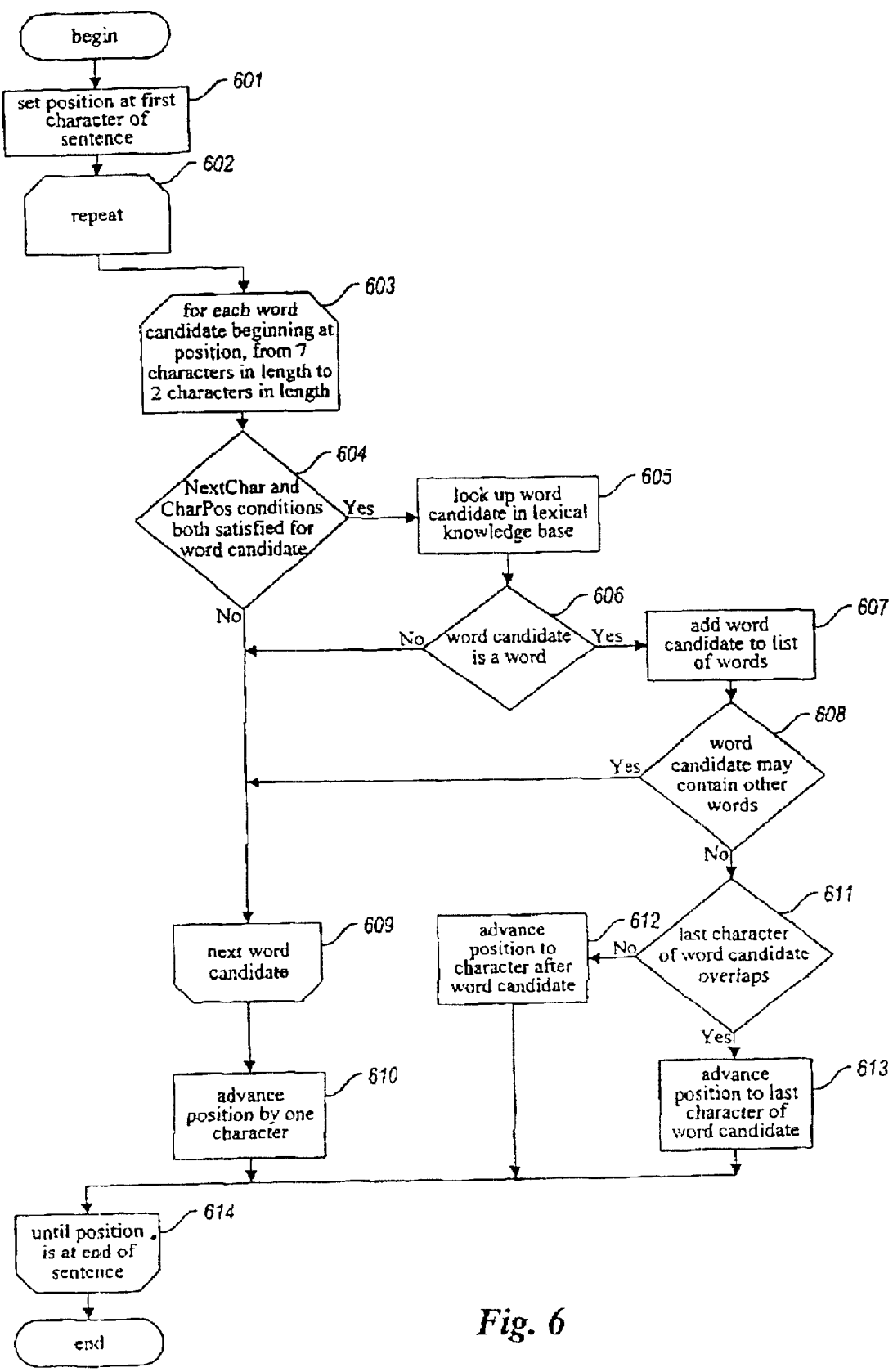
FIG. 6 is a flow diagram showing the steps preferably performed by the facility in order to add multiple-character words to the word list.

FIG. 6 is a flow diagram showing the steps preferably performed by the facility in order to add multiple-character words to the word list. These steps use a current position within the sentence in analyzing the sentence to identify multiple-character words. These steps further utilize the CharPos, NextChar, and IgnoreParts attributes added to the lexical knowledge base by the facility as shown in FIG. 4. In accordance with a first preferred embodiment, the facility retrieves these attributes from a lexical knowledge base on an as-needed basis during the performance of the steps shown in FIG. 6. In a second preferred embodiment, the values of the NextChar attributes and/or the CharPos attributes of the characters in the sentence are all pre-loaded before the performance of the steps shown in FIG. 6. In conjunction with the second preferred embodiment, a 3-dimensional array is preferably stored in the memory that contains the value of the CharPos attribute for each character occurring in the sentence. This array indicates, for a character at a given position in the sentence, whether the character may be at a given position in a word of a given length. Caching the values of these attributes allows them to be officially accessed when performing the steps shown in FIG. 6.

In step 601, the facility sets this position at the first character of the sentence. In step 602–614, the facility continues to repeat steps 603–613 until the position has advanced to the end of the sentence.

In steps 603–609, the facility loops through each word candidate that begins at the current position. The facility preferably begins with the word candidate that starts at the current position and is seven characters long, and, in each iteration, removes one character from the end of the word candidate until the word candidate is two characters long. If there are fewer than seven characters remaining in the sentence beginning from the current position, the facility preferably omits the iterations for the word candidates for which there are insufficient characters remaining in the sentence. In step 604, the facility tests for the current word candidate conditions relating to the NextChar and CharPos attributes of the characters comprising the word candidate. Step 604 is discussed in greater detail below in conjunction with FIG. 7. If both the NextChar and CharPos conditions are satisfied for the word candidate, then the facility continues in step 605, else the facility continues in step 609. In step 605, the facility looks up the word candidate in the lexical knowledge base to determine whether the word candidate is a word. In step 606, if the word candidate is a word, then the facility continues in step 607, else the facility continues in step 609. In step 607, the facility adds the word candidate to the list of words occurring in the sentence. In step 608, if the word candidate may contain other words, i.e., if the IgnoreParts attribute for the word is clear, then the facility continues in step 609, else the facility continues in step 611. In step 609, if additional word candidates remain to processed, then the facility continues in step 603 to process the next word candidate, else the facility continues in step 610. In step 610, the facility advances the current position one character toward the end of the sentence. After step 610, the facility continues in step 614.

In step 611, if the last character of the word candidate overlaps with another word candidate that may also be a word, then the facility continues in step 613, else the facility continues in step 612. Step 611 is discussed in greater detail below in conjunction with FIG. 8. In step 612, the facility advances the position to the character in the sentence after the last character of the word candidate. After step 612, the facility continues in step 614. In step 613, the facility advances the position to the last character of the current word candidate. After step 613, the facility continues in step 614. In step 614, if the position is not at the end of the sentence, then the facility continues in step 602 to consider a new group of word candidates, else these steps conclude.

Figure 7:
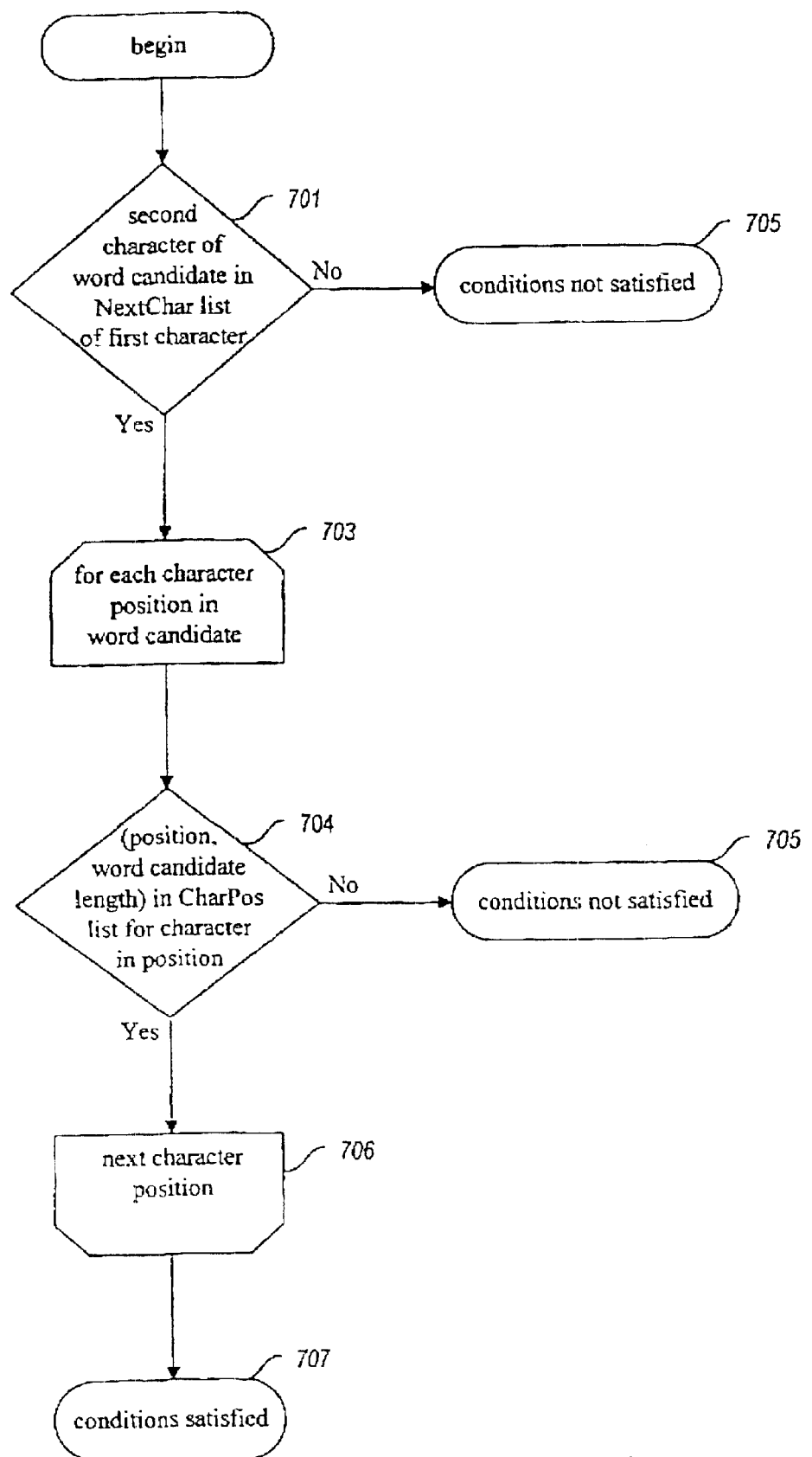
FIG. 7 is a flow diagram showing the step preferably performed by the facility in order to test the NextChar and CharPos conditions for a word candidate.

FIG. 7 is a flow diagram showing the step preferably performed by the facility in order to test the NextChar and CharPos conditions for a word candidate. In step 701, if the second character of the word candidate is in the NextChar list of the first character of the word candidate, then the facility continues in step 703, else the facility continues in step 702 to return the result that the conditions are both satisfied. In steps 703–706 the facility loops through each character position in the word candidate. In step 704, if the ordered pair made up of the current position and the length of the word candidate is among the ordered pairs in the CharPos list for the character in the current character position, then the facility continues in step 706, else the facility continues in step 705 to return the result that the conditions are not both satisfied. In step 706, if additional character positions remain in the word candidate to be processed, then the facility continues in step 703 to process the next character position in the word candidate, else the facility continues in step 707 to return the result that both conditions are satisfied by the word candidate.

Figure 8:
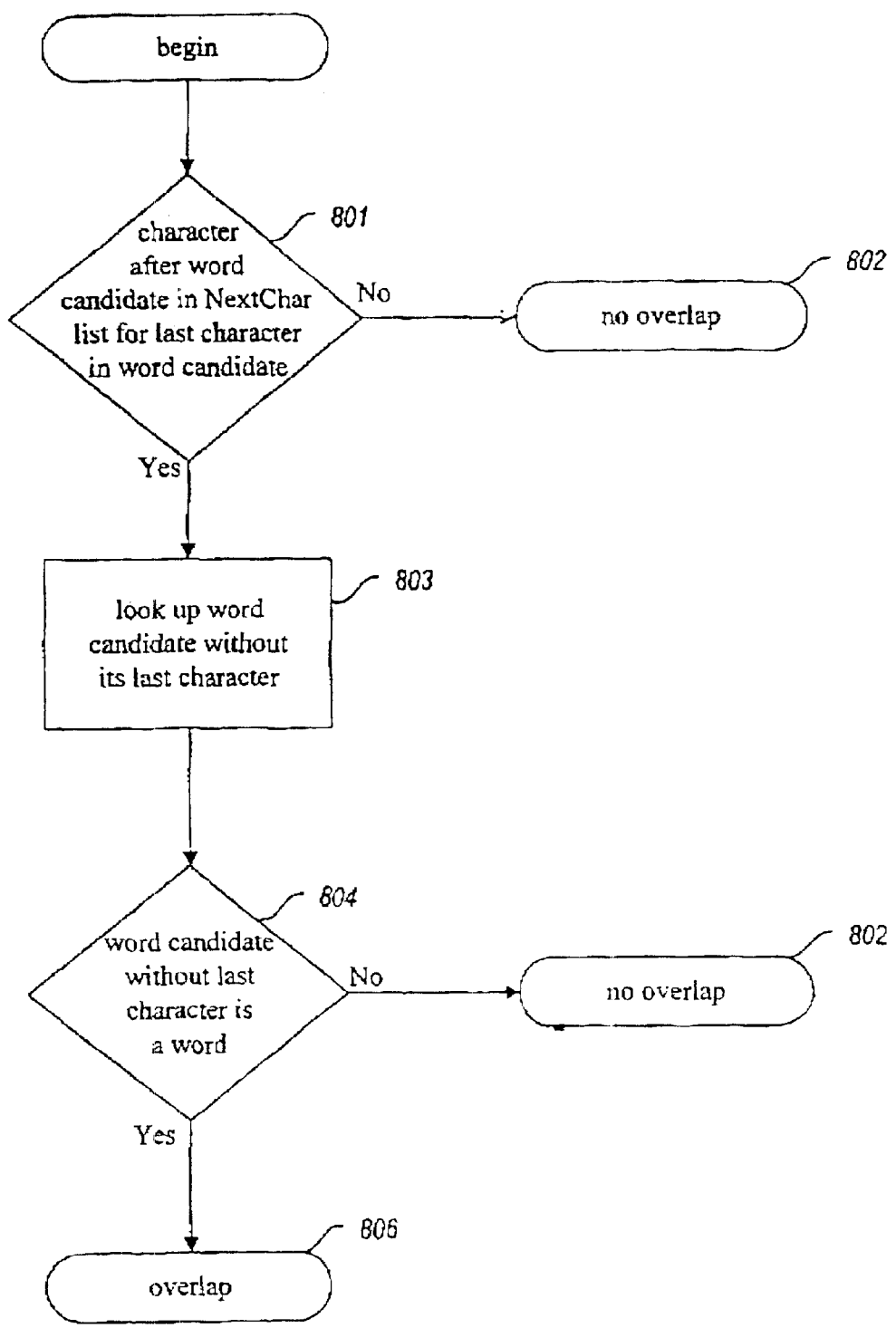
FIG. 8 is a flow diagram showing the steps preferably performed by the facility in order to determine whether the last character of the current word candidate overlaps with another word candidate that may be a word.

FIG. 8 is a flow diagram showing the steps preferably performed by the facility in order to determine whether the last character of the current word candidate overlaps with another word candidate that may be a word. In step 801, if the character after the word candidate is in the list of characters in the NextChar attribute for the last character of the word candidate, then the facility continues in step 803, else the facility continues in step 802 to return the result that there is no overlap. In step 803, the facility looks up in the lexical knowledge base the word candidate without its last character in order to determine whether the word candidate without its last character is a word. In step 804, if the word candidate without its last character is a word, then the facility continues in step 806 to return the result that there is overlap, else the facility continues in step 805 to return the result that there is no overlap.

The performance of the steps shown in FIG. 6 with respect to the example as shown below in Table 7.

TABLE 7

Character Combinations Considered

| number | combination | CharPos | NextChars | look up? | is a word? |
|---|---|---|---|---|---|
| 1 | 昨天下午委员会 | fail on 昨 | pass | no | no |
| 2 | 昨天下午委员 | fail on 昨 | pass | no | no |
| 3 | 昨天下午委 | fail on 昨 | pass | no | no |
| 4 | 昨天下午 | fail on 昨 | pass | no | no |
| 5 | 昨天下 | pass | pass | yes | no |
| 6 | 昨天 | pass | pass | yes | yes |
| 7 | 天下午委员会在 | fail on 天 | pass | no | no |
| 8 | 天下午委员会 | fail on 天 | pass | no | no |
| 9 | 天下午委员 | fail on 天 | pass | no | no |
| 10 | 天下午委 | fail on 午 | pass | no | no |
| 11 | 天下午 | fail on 午 | pass | no | no |
| 12 | 天下 | pass | pass | yes | yes |
| 13 | 下午委员会在布 | fail on 下 | pass | no | no |
| 14 | 下午委员会在 | fail on 下 | pass | no | no |
| 15 | 下午委员会 | fail on 下 | pass | no | no |
| 16 | 下午委员 | pass | pass | yes | no |
| 17 | 下午委 | pass | pass | yes | no |
| 18 | 下午 | pass | pass | yes | yes |
| 19 | 委员会在布宣诺 | fail on 委 | pass | no | no |
| 20 | 委员会在布宣 | fail on 委 | pass | no | no |

TABLE 7-continued

Character Combinations Considered

| number | combination | CharPos | NextChars | look up? | is a word? |
|---|---|---|---|---|---|
| 21 | 委员会在布 | fail on 委 | pass | no | no |
| 22 | 委员会在 | fail on 讨 | pass | no | no |
| 23 | 委员会 | pass | pass | yes | yes |
| 24 | 委员 | pass | pass | yes | yes |
| 25 | 会在布宣诺斯艾 | fail on 会 | fail | no | no |
| 26 | 会在布宣诺斯 | fail on 会 | fail | no | no |
| 27 | 会在布宣诺 | fail on 会 | fail | no | no |
| 28 | 会在布宣 | pass | fail | no | no |
| 29 | 会在布 | pass | fail | no | no |
| 30 | 会在 | pass | fail | no | no |
| 31 | 在布宣诺斯艾利 | fail on 在 | fail | no | no |
| 32 | 在布宣诺斯艾 | fail on 在 | fail | no | no |
| 33 | 在布宣诺斯 | fail on 在 | fail | no | no |
| 34 | 在布宣诺 | pass | fail | no | no |
| 35 | 在布宣 | pass | fail | no | no |
| 36 | 在布 | pass | fail | no | no |
| 37 | 布宣诺斯艾利斯 | pass | pass | yes | yes |
| 38 | 讨论了这个问题 | fail on 讨 | pass | no | no |
| 39 | 讨论了这个问 | fail on 讨 | pass | no | no |
| 40 | 讨论了这个 | fail on 讨 | pass | no | no |
| 41 | 讨论了这 | fail on 这 | pass | no | no |
| 42 | 讨论了 | pass | pass | yes | no |
| 43 | 讨论 | pass | pass | yes | yes |
| 44 | 了这个问题 | fail on 了 | fail | no | no |
| 45 | 了这个问 | fail on 这 | fail | no | no |
| 46 | 了这个 | fail on 这 | fail | no | no |
| 47 | 了这 | fail on 这 | fail | no | no |
| 48 | 这个问题 | pass | pass | yes | no |
| 49 | 这个问 | fail on 问 | pass | no | no |
| 50 | 这个 | pass | pass | yes | yes |
| 51 | 个问题 | pass | fail | no | no |
| 52 | 个问 | pass | fail | no | no |
| 53 | 问题 | pass | pass | yes | yes |

Table 7 indicates, for each of the 53 combinations of characters from the sample sentence considered by the facility: the result of the CharPos test, the result of the NextChars test, whether the facility looked up the word in the lexical knowledge base, and whether the lexical knowledge base indicated that the combination of characters is a word.

It can be seen that combinations 1–4 failed the CharPos test because the CharPos attribute of the character "员" does not contain the ordered pairs (1, 7), (1, 6), (1, 5), or (1, 4). For combinations 5 and 6, on the other hand, both the CharPos and NextChars tests are passed. The facility therefore looks up combinations 5 and 6 in the lexical knowledge base, to determine that combination 5 is not a word, but combination 6 is a word. After processing combination 6, and determining how far to advance the current position, the facility determines that the IgnoreParts attribute is set, but that the word "员, 儿" overlaps with a word candidate beginning with the character "儿." The facility therefore advances to the character "儿" at the end of combination 6 in accordance with step 613. In combinations 7–12, only combination 12 passes the CharPos and NextChars tests. Combination 12 is therefore looked up and determined to be a word. After processing combination 12, and determining how far to advance the current position, the facility determines that the IgnoreParts attribute of the word constituted by combination 12 is clear, and therefore advances the current position one character to the character "晚" rather than to the character following combination 12.

It can further be seen that combinations 18, 24, 37, and 43 are words that have their IgnoreParts attribute set and do not overlap in their final characters with any word candidates that may be words. After processing each, therefore, the facility advances the current position to the character following the character combination in accordance with step 612, thereby omitting to process unnecessarily up to 41 additional combinations for each of these four combinations.

It can further be seen that the IgnoreParts attributes of the words constituted by combinations 23 and 50 are clear. For this reason, the facility advances the current position only one character in accordance with step 610 after processing these combinations.

It can further be seen that the two-character combinations 30, 36, 47, and 52 are not determined by the facility to constitute words. The facility therefore advances the current position only one character after processing these combinations in accordance with step 610; In all, the facility looks up only 14 of 112 possible combinations in the sample sentence. Of the 14 combinations looked up by the facility, nine are in fact real words.

As shown below in Table 8, after the processing described in conjunction with table 7, the word list contains the words constituted by combinations 6, 12, 18, 23, 24, 37, 43, 50, and 53.

TABLE 8

Word List with Multiple-Character Words

| Number | Word | part of speech |
|---|---|---|
| 6 | 昨天 | noun |
| 12 | 天下 | noun |
| 18 | 下午 | noun |
| 24 | 委员 | noun |
| 23 | 委员会 | noun |
| 37 | 布宜诺斯艾利斯 | noun |
| 43 | 讨论 | verb |
| 50 | 这个 | pronoun |
| 53 | 问题 | noun |

Figure 9:
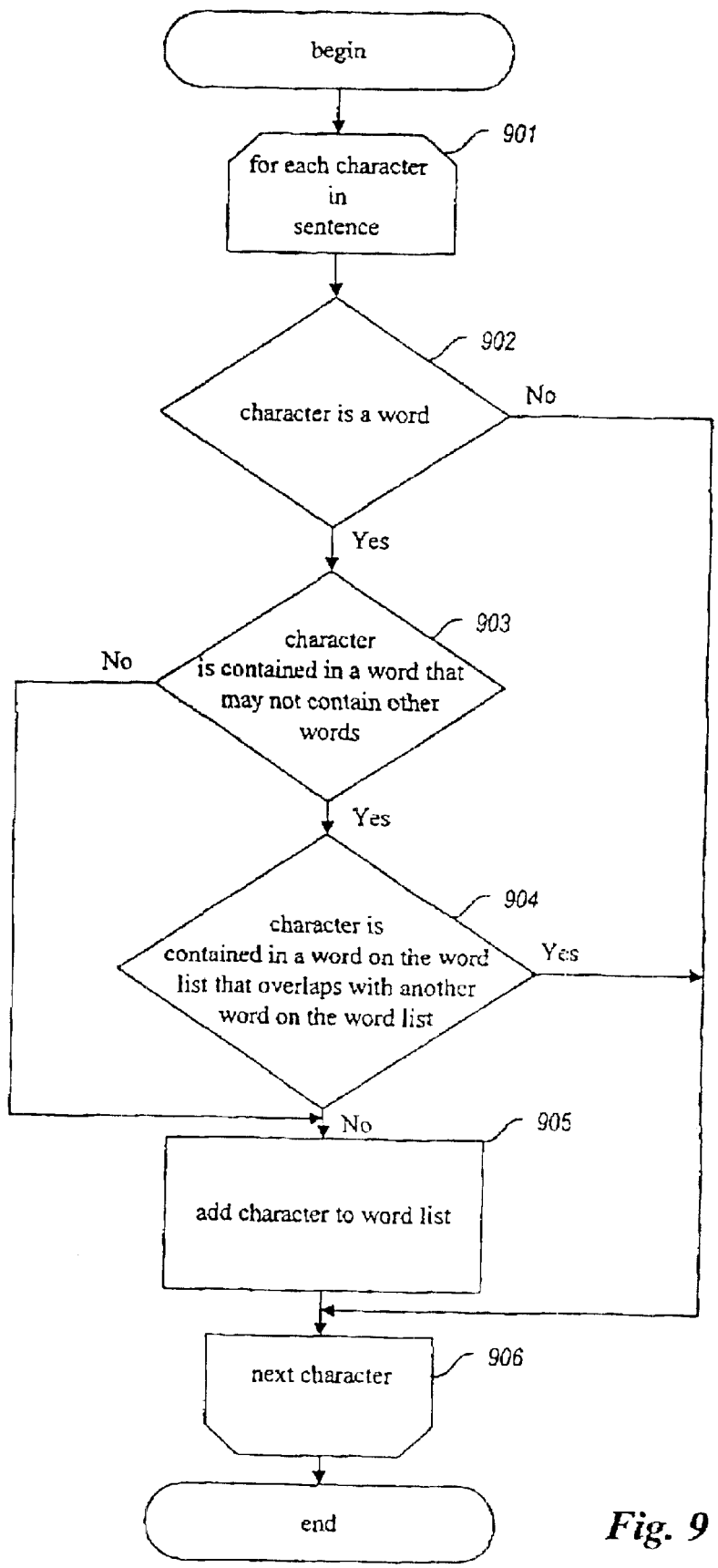
FIG. 9 is a flow diagram showing the steps preferably performed by the facility in order to add single-character words to the word list.

FIG. 9 is a flow diagram showing the steps preferably performed by the facility in order to add single-character words to the word list. In steps 901–906, the facility loops through each character in the sentence, from the first character to the last character. In step 902, the facility determines, based on its entry in the lexical knowledge base, whether the character comprises a single-character word, else the facility continues in step 906 without adding a character to the word list. If the character comprises a single-character word, then the facility continues in step 903, else the facility continues in step 906 without adding the character to the word list. In step 903, if the character is contained in word that may not contain other words, i.e., a word already on the word list has its Ignore parts attribute set, then the facility continues in step 904, else the facility continues in step 905 to add the character to the word list. In step 904, if the character is contained in a word on the word list that overlaps with another word on the word list, then the facility continues in step 906 without adding the character to the word list, else the facility continues in step 905. In step 905, the facility adds the single-character word comprising the current character to the word list. In step 906, if additional characters remain in the sentence to be processed, then the facility continues in step 901 to process the next character in the sentence, else these steps conclude.

Table 9 below shows that, in performing the steps shown in FIG. 9, the facility adds single-character words 54–61 to the word list.

TABLE 9

Word List with Single- and Multiple-Character Words

| Number | Word | part of speech |
|---|---|---|
| 6 | 昨天 | noun |
| 54 | 昨 | morpheme |
| 55 | 天 | noun |
| 12 | 天下 | noun |
| 56 | 下 | noun (localizer) |
| 18 | 下午 | noun |
| 24 | 委员 | noun |
| 23 | 委员会 | noun |
| 57 | 会 | noun |
| 57 | 会 | verb |
| 58 | 在 | verb |
| 58 | 在 | preposition |
| 58 | 在 | adverb |
| 37 | 布宜诺斯艾利斯 | noun |
| 43 | 讨论 | verb |
| 59 | 了 | function word |
| 50 | 这个 | pronoun |
| 60 | 这 | pronoun |
| 61 | 个 | noun (classifier) |
| 53 | 问题 | noun |

It should be understood that adding multiple-character words to the word list, and then adding single-character words to the word list is but one exemplary method of creating the word list. In an alternative approach, the word list can be obtained by first locating the single-character words and then adding to the word list multiple-character words. With respect to locating first the single-character words, the approach is similar to the approach described above and illustrated in FIG. 9; however, steps 903 and 904 are omitted. Specifically, in step 902, the facility determines, based on its entry in the lexical knowledge base, whether the character comprises a single-character word. If the character comprises a single-character word, then the facility continues in step 905 to add the character to the word list, else the facility continues in step 906 without adding the character to the word list. The facility processes each character in the sentence to determine if the character is a word by looping through steps 901, 902, 905 and 906.

In the alternative approach, the facility then processes the sentence to locate multiple-character words, and to add such words to the word list. The facility can use the method described above with respect to FIG. 6. However, since the sentence may contain multiple-character words that cannot contain other words, i.e., if the IgnoreParts attribute for the multiple-character word is set, then it is beneficial to delete or remove from the word list those single-character words that make up the multiple-character word. Removal of these single-character words from the word list minimizes the analysis required of the parser 133.

The removal of single-character words from the word list is complicated, however, if two multiple-character words, having their IgnoreParts attributes set, overlap. A generic example will be instructive. Suppose, a character sequence ABC is present in the sentence under consideration and that the sequence can comprise multiple character words AB and BC that have their IgnoreParts attribute set. Suppose also that A, B and C are single-character words. There will be a problem if all the single-character words covered by words AB and BC are simply removed from the word list. Specifically, the word A will be missed if BC is the correct word in the sentence. Likewise, the word C will be missed if the word AB is the correct word in the sentence. In either case, the sentence will not be parsed, because none of the "paths" through the sentence is unbroken. To prevent this from happening, all the single-character words in a multiple-character word will be retained regardless of the value of the IgnoreParts attribute except for the word(s) covered by the overlapping part. In the generic example described above, both words A and C will be retained in the word list; however, B will be removed from the word list since it is the overlapping portion of the sequence. Referring to FIG. 8, if the facility reaches step 802 in the alternative approach, all of the single-character words making up the word candidate would be removed from the list. If the facility, instead, reaches step 806, the non-overlapping single-character words will be retained, while the overlapping portion(s) will be removed.

In the method described above, possible overlapping words are located by examining the NextChar list for the last character in a word candidate (step 801), and ascertaining if a word candidate without its last character is a word (step 804). In an alternative approach, overlapping words can be found by examining other information that is provided to the parser 133 along with the word list. Specifically, in addition to the word list, the parser 133 receives positional information of each word in the word list. From the example of Table 3, each of the characters are numbered sequentially from 1 to 22. Using this positional information, a starting position of the word and an ending position of the word are determined for each word in the word list. Referring to the word identified in Table 9 by way of example, the word denoted by number "6" would have a starting character position of 1 and an ending character position of 2, while the word denoted by number "12" would have a starting character position of 2 and an ending character position of 3. Single-character words would have a starting character position equal to an ending character position. Overlapping words can then be easily ascertained by examining the ending character position and the starting character position of possible adjacent words in the sentence. Specifically, if the ending character position of a possible word in the sentence is greater than or equal to the starting character position of the next possible word in the sentence, an overlap condition exists.

Figure 10:
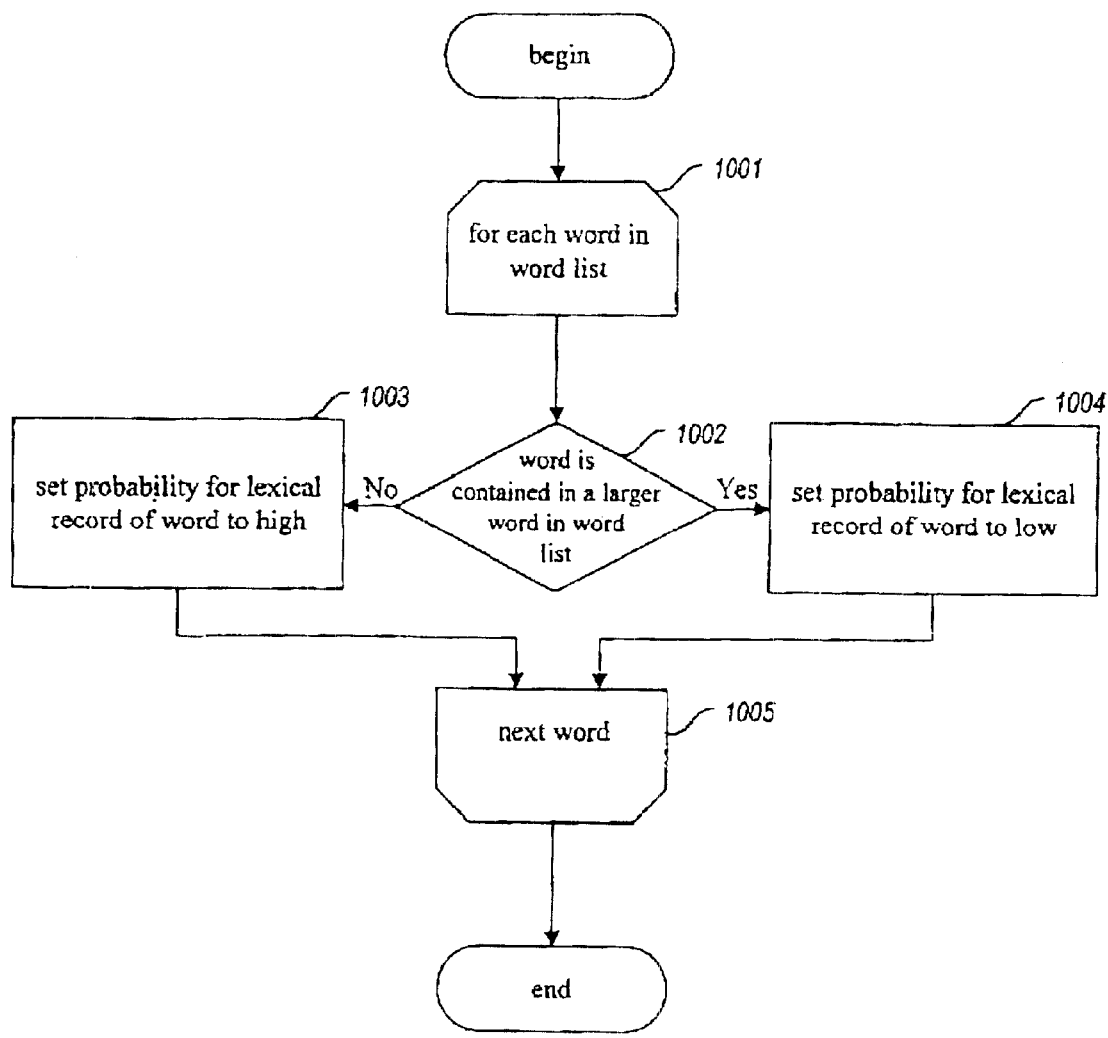
FIG. 10 is a flow diagram showing the steps preferably performed by the facility in order to assign probabilities to the lexical records generated from the words in the word list in accordance with a first approach.
Figure 11:
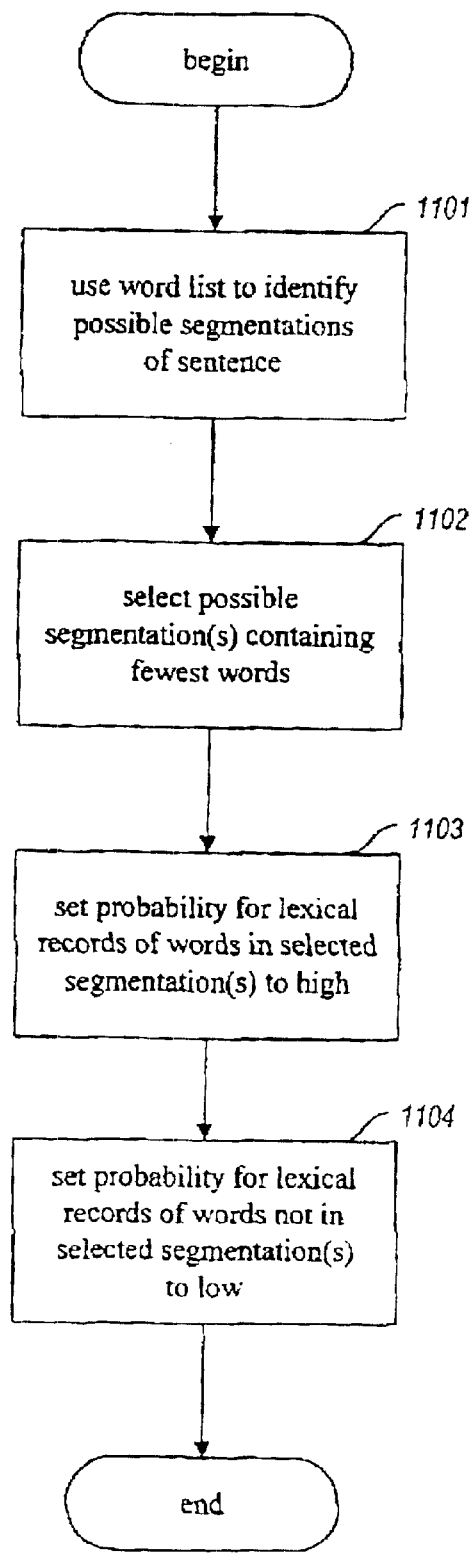
FIG. 11 is a flow diagram showing the steps preferably performed by the facility in order to assign probabilities to the lexical records generated from the words in the word list in accordance with a second approach.

After adding multiple- and single-character words to the word list and generating lexical records for those words, the facility assigns probabilities to the lexical records that is used by the parser to order the application over the lexical records in the parsing process. FIGS. 10 and 11, discussed below, show two alternative approaches used by the facility in order to assign probabilities to the lexical records.

FIG. 10 is a flow diagram showing the steps preferably performed by the facility in order to assign probabilities to the lexical records generated from the words in the word list in accordance with a first approach. The facility preferably ultimately sets the probability for each lexical record to either a high probability value that will cause the parser to consider the lexical record early during the parsing process, or to a low probability value, which will cause the parser to consider the lexical record later in the parsing process. In steps 1001–1005, the facility loops through each word in the word list. In step 1002, if the current word is contained in a larger word in the word list, then the facility continues in step 1004, else the facility continues in step 1003. In step 1003, the facility sets the probability for the lexical record representing the word to the high probability value. After step 1003, the facility continues in step) 1005. In step 1004, the facility sets the probability for the lexical records representing the word to the low probability value. After step 1004, the facility continues in step 1005. In step 1005, if additional words remain in the word list to be processed, then the facility continues in step 1001 to process the next word in the word list, else these steps conclude.

Table 10 below shows the probability values assigned to each word in the word list in accordance with steps shown in FIG. 10. It can be seen by reviewing the probabilities that the facility assigns the high probability value to at least one word containing each character, so that at least one lexical record containing each character is considered early in the parsing process.

TABLE 10

Word List with Probabilities

| Number | Word | part of speech | probability value |
|---|---|---|---|
| 6 | 昨天 | noun | high |
| 54 | 昨 | morpheme | low |
| 55 | 天 | noun | low |
| 12 | 天下 | noun | high |
| 56 | 下 | noun (localizer) | low |
| 18 | 下午 | noun | high |
| 24 | 委员 | noun | low |
| 23 | 委员会 | noun | high |
| 57 | 会 | noun | low |
| 57 | 会 | verb | low |
| 58 | 在 | verb | high |
| 58 | 在 | preposition | high |
| 58 | 在 | adverb | high |
| 37 | 布宜诺斯艾利斯 | noun | high |
| 43 | 讨论 | verb | high |
| 59 | 了 | function word | high |
| 50 | 这个 | pronoun | high |
| 60 | 这 | pronoun | low |
| 61 | 个 | noun (classifier) | low |
| 53 | 问题 | noun | high |

FIG. 11 is flow diagram showing the steps preferably performed by the facility in order to assign probabilities to the lexical records generated from the words in the word list in accordance with a second approach. In step 1101, the facility uses the word list to identify all the possible segmentations of the sentence comprised entirely of the words in the word list. In step 1102, the facility selects the one or more possible segmentations identified in step 1101 that contain the fewest words. If more than one of the possible segmentations has the minimum number of words, the facility selects each such possible segmentation. Table 11 below shows the possible segmentation generated from the word list shown in Table 9 having the fewest words (9).

TABLE 11

昨天下午委员会在布宜诺斯艾利斯讨论了这个问题。

In step 1103, the facility sets the probability for the lexical records of the words in the selected segmentation(s) to the high probability value. In step 1104, the facility sets the probability for the lexical records of the words not in selected segmentation(s) to the low probability value. After step 1104, these steps conclude.

Table 12 below shows the probability values assigned to each word in the word list in accordance with steps shown in FIG. 11. It can be seen by reviewing the probabilities that the facility assigns the high probability value to at least one word containing each character, so that at least one lexical record containing each character is considered early in the parsing process.

TABLE 12

Word List with Probabilities

| Number | Word | part of speech | probability value |
|---|---|---|---|
| 6 | 昨天 | Noun | high |
| 54 | 昨 | Morpheme | low |
| 55 | 天 | Noun | low |
| 12 | 天下 | Noun | low |
| 56 | 下 | noun (localizer) | low |
| 18 | 下午 | Noun | high |
| 24 | 委员 | noun | low |
| 23 | 委员会 | noun | high |
| 57 | 会 | noun | low |
| 57 | 会 | Verb | low |
| 58 | 在 | Verb | high |
| 58 | 在 | Preposition | high |
| 58 | 在 | Adverb | high |
| 37 | 布宜诺斯艾利斯 | Noun | high |
| 43 | 讨论 | Verb | high |
| 59 | 了 | Function word | high |
| 50 | 这个 | Pronoun | high |
| 60 | 这 | Pronoun | low |
| 61 | 个 | Noun (classifier) | low |
| 53 | 问题 | Noun | high |

In a further embodiment, probabilities can also be assigned to overlapping pairs of words. In the generic character sequence ABC statistical data may indicate that the probability of the combination of words AB and C is higher than the combination of A and BC. Thus, the parser 133 should consider the combination AB and C first, whereas the combination of A and BC should not be considered unless no successful analysis can be found using AB and C. Statistical data may also indicate that one of the possible combinations AB and C, or A and BC is impossible.

In order to assign relative probabilities to a word in an overlapping pair of words, or remove impossible combinations, information is stored in the lexical knowledge base 132. In particular, additional lists can be associated with many multiple-character words in the lexical knowledge base 132. The lists include:

(1) a first left condition list—the word in this entry would be assigned a low probability if it is immediately preceded by one of the characters in this list in the sentence;

(2) a first right condition list—the word in this entry would be assigned a low probability if it is immediately followed by one of the characters in this list in a sentence;

(3) a second left condition list—the word in this entry would be ignored if it is immediately preceded by one of the characters in this list in a sentence. In other words, if a multiple-character word in the word list meets this condition, it will be removed from the word list; and (4) a second right condition list—the word in this entry would be ignored if it is immediately followed by one of the characters in this list in a sentence. In other words, if the word in the word list meets this condition, it will be removed from the word list.

It should be noted that each of the foregoing lists may not be present for every multiple-character word in the lexical knowledge base 132. In other words, some of the multiple character words in the lexical knowledge base 132 may not have any of the foregoing lists, while other will have one, some or all of the lists. If desired, other lists can be generated based on immediately preceding or following characters. For instance, lists can be generated to assign high probabilities. The lists are entered in the lexical knowledge base 132 manually.

In addition to analysis using a lexical knowledge base to resolve disambiguation as discussed above, a rule-base disambiguation analysis can also be used in combination with the lexical analysis before parsing begins. For example, if a character string ABCD is present in a sentence where AB, BC and CD are al; possible words, word BC can be ignored (removed from the word list) if AB does not overlap with a preceding word, CD does not overlap with a following word, either A or D is a non-word, and neither ABC nor BCD is a word.

It should be emphasized, however, that there is no logical dependency between the parser's ability to resolve segmentation ambiguities and the lexical disambiguation described above. The elimination of words at the lexical level reduces parsing complexity, but is not always a necessary condition for the successful analysis of a sentence. Parsing will be successful as long as all of the correct words in a sentence are in the word list provided by the facility 131, and the number of words in the word list is not so great as to overburden the parser 133. Therefore, the success of sentence analysis, including correct word segmentation, does not depend on the complete success of lexical disambiguation, though the latter will greatly facilitate the former. This allows development of the facility 131 and the parser 133 independently despite the fact that there is interaction between the components.

Figure 12:
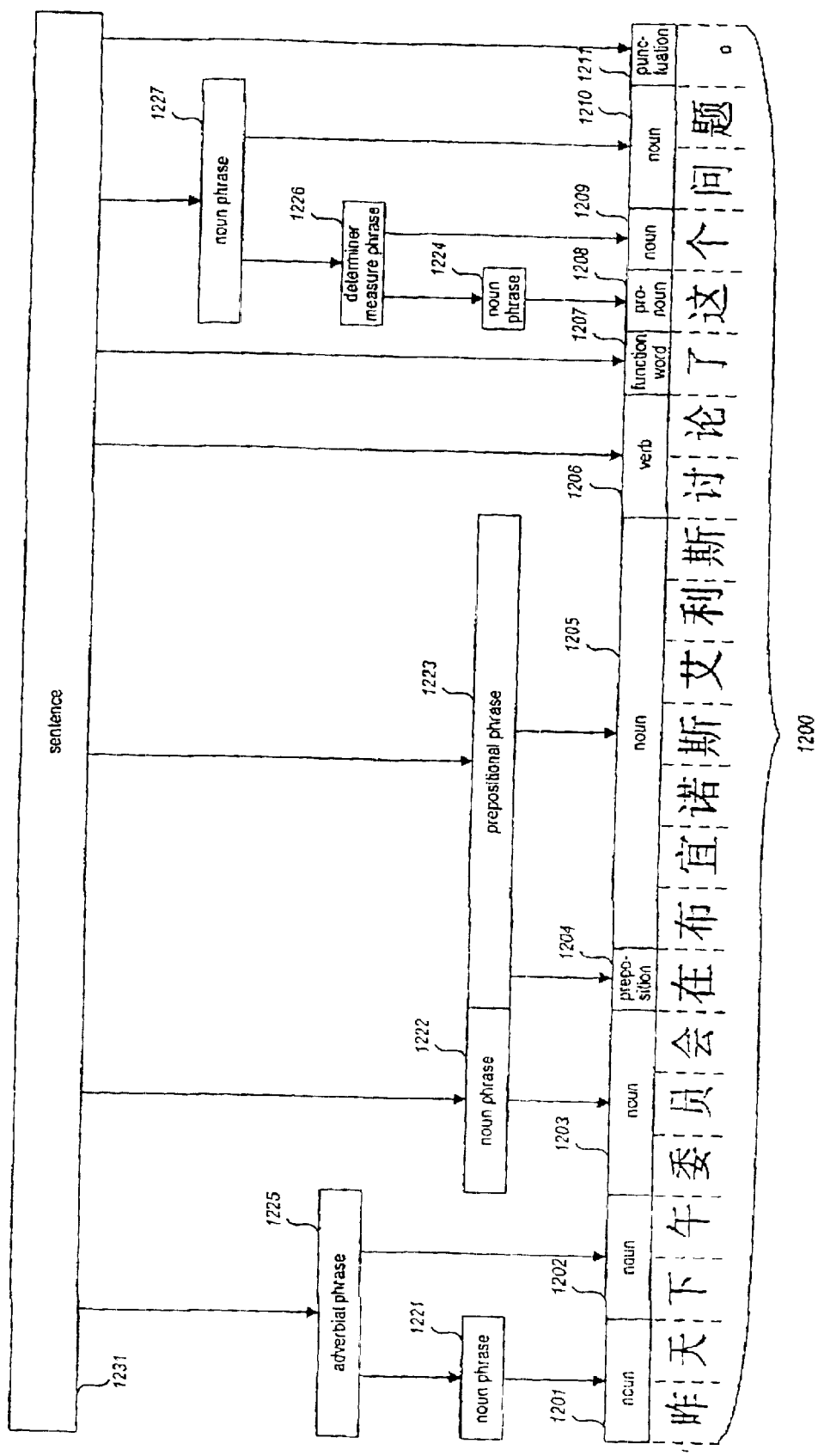
FIG. 12 is a parse tree diagram showing a parse tree generated by the parser representing the syntactic structure of the sample sentence.

FIG. 12 is a parse tree diagram showing a parse tree generated by the parser representing the syntactic structure of the sample sentence. It can be seen that the parse tree is a hierarchical structure having a single sentence record 1231 as its head and having a number of lexical records 1201–1211 as its leaves. The parse tree further has intermediate syntactic records 1221–1227 that combine lexical records each representing a word into a larger syntactic structure representing one or more words. For example, the prepositional phrase record 1223 combines a lexical record 1204 representing a preposition and lexical record 1206, representing a noun. In accordance with step 506 of FIG. 5, the facility identifies the words represented by lexical records 1201–1211 in the parse tree as the words into which the sample sentence should be segmented. This parse tree may also be retained by the facility in order to perform additional natural language processing on the sentence.

While this invention has been shown and described with reference to preferred embodiments, it will be understood by those skilled in the art that various changes or modifications in form and detail may be made without departing from the scope of the invention. For example, aspects of the facility may be applied to perform word segmentation in languages other than Chinese. Further, proper subsets or supersets of the techniques described herein may be applied to perform word segmentation.

We claim:

1. A method in a computer system for identifying individual words occurring in a sentence of Chinese text, the method comprising the steps of:

for each of a plurality of textual characters:
  storing a first indication of a set of characters that occur in the second position of words that begin with the character; and
  storing a second indication of a set of positions in which the character occurs in words;
for each of a plurality of contiguous groups of characters occurring in the sentence:
  determining whether the character occurring in the second position of the group is indicated to occur in words that begin with the character occurring in the first position of the group from the first indication;
  if it is determined that the character occurring in the second position of the group is indicated to occur in words that begin with the character occurring in the first position of the group, determining whether every character of the group is indicated to occur in words in the position in which it occurs in the group from the second indication;
  if it is determined that every character of the group is indicated to occur in words in the position in which it occurs in the group, comparing the group of characters to a list of words used in the Chinese language to determine whether the group of characters is a word used in the Chinese language;
submitting the groups of characters determined to be words used in the Chinese language to a syntactic parser;
receiving from the syntactic parser a parse structure identifying the syntactic structure of the sentence, the parse structure specifying a subset of the submitted groups of characters as being part of the syntactic structure of the sentence; and
identifying the groups of characters specified by the parse structure as words occurring in the sentence.

2. The method of claim 1, further comprising the steps of:
reading the list of words used in the Chinese language; and
generating the stored first and second indications based upon the occurrence of characters in the read list of words.

3. The method of claim 1 wherein the steps performed for a plurality of contiguous groups of characters occurring in the sentence are not performed for at least one contiguous group of characters containing characters that are also contained by a larger group of characters determined to be a word that cannot contain smaller words.

4. The method of claim 3 wherein the steps performed for a plurality of contiguous groups of characters occurring in the sentence are performed for at least one selected contiguous group of characters, the selected group including a first and second character, the first character being the last character of a preceding group of characters determined to be a word that cannot contain smaller words where:
  the second character is indicated to occur in words that begin with the first character; and
  the preceding group of characters without the first character is a word used in the Chinese language.

5. The method of claim 1, further comprising the step of, before the performance of the determining steps, retrieving the stored first and second indications.

6. A method in a computer system for identifying individual words occurring in a sentence of text of an unsegmented language, the method comprising the steps of:
for each of a plurality of textual characters:
  storing a first indication of a set of characters that occur in the second position of words that begin with the character; and
  storing a second indication of a set of positions in which the character occurs in words;
for each of a plurality of contiguous groups of characters occurring in the sentence:
  determining whether the character occurring in the second position of the group is indicated to occur in words that begin with the character occurring in the first position of the group from the first indication;
  if it is determined that the character occurring in the second position of the group is indicated to occur in words that begin with the character occurring in the first position of the group, determining whether every character of the group is indicated to occur in words in the position in which it occurs in the group from the second indication;
  if it is determined that every character of the group is indicated to occur in words in the position in which it occurs in the group, comparing the group of characters to a list of words to determine whether the group of characters is a word;
submitting the groups of characters determined to be words to a syntactic parser;
receiving from the syntactic parser a parse structure identifying the syntactic structure of the sentence, the parse structure specifying a subset of the submitted groups of characters as being part of the syntactic structure of the sentence; and
identifying the groups of characters specified by the parse structure as words occurring in the sentence.

7. A method in a computer system for identifying individual words occurring in a sentence of text, the method comprising the steps of:
for each of a plurality of textual characters:
  storing a first indication of a set of characters that occur in the second position of words that begin with the character; and
  storing a second indication of a set of positions in which the character occurs in words;
for each of a plurality of contiguous groups of characters occurring in the sentence:
  determining whether the character occurring in the second position of the group is indicated to occur in words that begin with the character occurring in the first position of the group from the first indication;
  if it is determined that the character occurring in the second position of the group is indicated to occur in words that begin with the character occurring in the first position of the group, determining whether every character of the group is indicated to occur in words in the position in which it occurs in the group from the second indication;
  if it is determined that every character of the group is indicated to occur in words in the position in which it occurs in the group, comparing the group of characters to a list of words to determine whether the group of characters is a word;
submitting the groups of characters determined to be words to a syntactic parser;
receiving from the syntactic parser a parse structure identifying the syntactic structure of the sentence, the parse structure specifying a subset of the submitted groups of characters as being part of the syntactic structure of the sentence; and
identifying the groups of characters specified by the parse structure as words occurring in the sentence.

8. A method in a computer system for identifying the words of which a body of natural language text is comprised, the body of natural language text comprising an ordered sequence of characters starting with a first character, ending with a last character, and containing a selected interior character between the first and last characters, the method comprising the steps of:

identifying within the sequence of characters a first word containing the first character and the selected interior character;

identifying within the sequence of characters a second word containing the last character but not the selected interior character, such that the first and second words may be concatenated to form the sequence of characters;

identifying within the sequence of characters a third word containing the first character but not the selected interior character;

identifying within the sequence of characters a fourth word containing the selected interior character and the last character, such that the third and fourth words may be concatenated to form the sequence of characters;

submitting the first, second, third, and fourth words to a syntactic parser to generate a parse tree representing the syntactic structure of the sequence of characters, the parse tree containing either the first and second words or the third and fourth words;

if the parse tree contains the first and second words, indicating that the first and second words comprise the body of natural language text; and if the parse tree contains the third and fourth words, indicating that the third and fourth words comprise the body of natural language text.

9. The computer-readable medium of claim 8 wherein for each of a plurality of words having an indication of probability, the instructions further comprise storing an associated list of characters.

10. A computer-readable medium whose contents cause a computer system to identify the words of which a body of natural language text is comprised, the body of natural language text comprising an ordered sequence of characters starting with a first character, ending with a last character, and containing a selected interior character between the first and last characters, by performing the steps of:

identifying within the sequence of characters a first word containing the first character and the selected interior character;

identifying within the sequence of characters a second word containing the last character but not the selected interior character, such that the first and second words may be concatenated to form the sequence of characters;

identifying within the sequence of characters a third word containing the first character but not the selected interior character;

identifying within the sequence of characters a fourth word containing the selected interior character and the last character, such that the third and fourth words may be concatenated to form the sequence of characters;

submitting the first, second, third, and fourth words to a syntactic parser to generate a parse tree representing the syntactic structure of the sequence of characters, the parse tree containing either the first and second words or the third and fourth words;

if the parse tree contains the first and second words, indicating that the first and second words comprise the body of natural language text; and if the parse tree contains the third and fourth words, indicating that the third and fourth words comprise the body of natural language text.

11. The computer-readable medium of claim 10 wherein the submitting step includes the step of submitting to the syntactic parser a supersequence of characters containing the sequence of characters and comprising a sentence to generate a parse tree representing the syntactic structure of the sentence.

12. A method in a computer system for selecting from a sequence of natural language characters combinations of characters that may be words using indications for each of a plurality of characters of the characters that occur in the second position of words that begin with the character and of the positions in which the character occurs in words, the method comprising the steps of, for each of a plurality of contiguous combination of characters occurring in the sequence:

determining whether the character occurring in the second position of the combination is indicated to occur in words that begin with the character occurring in the first position of the combination by accessing a first stored indication indicating a set of characters that occur in the second position of words that begin with the character occurring in the first position of the combination;

if it is determined that the character occurring in the second position of the combination is indicated to occur in words that begin with the character occurring in the first position of the combination, determining whether every character of the combination is indicated to occur in words in the position in which it occurs in the combination by accessing a second stored indication indicating a set of positions in which the respective character occurs in words; and if it is determined that every character of the combination is indicated to occur in words in the position in which it occurs in the combination, determining that the combination of characters may be a word.

13. The method of claim 12, further comprising the step of comparing the combination of characters to a list of words to determine whether the combination of characters is a word.

14. A computer-readable medium whose contents cause a computer system to select from a sequence of natural language characters combinations of characters that may be words using indications for each of a plurality of characters of the characters that occur in the second position of words that begin with the character and of the positions in which the character occurs in words, by performing the steps of, for each of a plurality of contiguous combinations of characters occurring in the sequence:

determining whether the character occurring in the second position of the combination is indicated to occur in words that begin with the character occurring in the first position of the combination by accessing a first stored indication indicating a set of characters that occur in the second position of words that begin with the character occurring in the first position of the combination;

if it is determined that the character occurring in the second position of the combination is indicated to occur in words that begin with the character occurring in the first position of the combination, determining whether every character of the combination is indicated to occur in words in the position in which it occurs in the combination by accessing a second stored indication indicating a set of positions in which the respective character occurs in words; and if it determined that every character of the combination is indicated to occur in words in the position in which it occurs in the combination, determining that the combination of characters may be a word.

15. The computer-readable medium of claim 14, further comprising the step of comparing the combination of characters to a list of words to determine whether the combination of characters is a word.

16. For a selected sequence of characters comprising a single selected Chinese word, a method in a computer system for determining whether the selected sequence of characters may also comprise a series of two or more words, the method comprising the steps of:

if the selected sequence of characters is at least four characters long, determining that the selected sequence of characters may not also comprise a series of two or more words;

if all of the characters of the selected sequence do not constitute single-character words, determining that the selected sequence of characters may not also comprise a series of two or more words;

if the word contains a word commonly used as a derivational affix, determining that the selected sequence of characters may not also comprise a series of two or more words; and if it not determined that the selected sequence of characters may not also comprise a series of two or more words, determining that the selected sequence of characters may also comprise a series of two or more words.

17. The method of claim 16, further comprising the step of, if an adjacent pair of characters in of the selected sequence are often divided into separate words where they appear adjacently, determining that the selected sequence of characters may also comprise a series of two or more words.

18. For a selected sequence of characters comprising a single selected natural language word, a computer-readable medium whose contents cause a computer system to determine whether the selected sequence of characters may also comprise a series of two or more words by performing the steps of:

if the selected sequence of characters is at least four characters long, determining that the selected sequence of characters may not also comprise a series of two or more words;

if all of the characters of the selected sequence do not constitute single-character words, determining that the selected sequence of characters may not also comprise a series of two or more words;

if the word contains a word commonly used as a derivational affix, determining that the selected sequence of characters may not also comprise a series of two or more words; and if it not determined that the selected sequence of characters may not also comprise a series of two or more words, determining that the selected sequence of characters may also comprise a series of two or more words.

19. The computer-readable medium of claim 18 wherein the contents of the computer-readable medium further cause the computer system to perform the step of, if an adjacent pair of characters in of the selected sequence are often divided into separate words where they appear adjacently, determining that the selected sequence of characters may also comprise a series of two or more words.

20. A method of identifying a segmentation for a sequence of characters from a non-segmented language, the method comprising:

identifying a pair of contiguous words in the sequence of characters;

identifying an overlapping word comprising at least one character from each word in the pair of contiguous words;

submitting indications of the contiguous words and the overlapping word to a syntactic parser; and performing a full syntactic parse to generate a parse tree, the parse tree implicitly segmenting the sequence of characters by including either the pair of contiguous words or the overlapping word but not both.

21. A method in a computer system for identifying individual words occurring in a sentence of text, the method comprising the steps of:

for each of a plurality of contiguous groups of characters occurring in the sentence:
determining overlapping possible words;
ascertaining probability of each possible word by accessing a stored indication of probability of whether the word occurs in natural language text as a function of adjacent characters; and
submitting the groups of characters determined to be possible words to a parser with an indication of probability.

22. The method of claim 21 wherein ascertaining probability further comprises accessing an associated list of characters for each stored indication of probability.

23. The method of claim 21 wherein an indication of probability is low if the word is preceded by one of the characters in a list.

24. The method of claim 21 wherein an indication of probability is low if the word is followed by one of the characters in a list.

25. The method of claim 21 wherein an indication of probability is zero if the word is preceded by one of the characters in a list.

26. The method of claim 1 wherein an indication of probability is zero if the word is followed by one of the characters in a list.

27. The method of claim 21 wherein the natural language is Chinese.

28. A computer readable medium storing instructions for a computer system for identifying individual words occurring in a sentence of text, the instructions comprising the steps of:

for each of a plurality of contiguous groups of characters occurring in the sentence:
determining overlapping possible words;
ascertaining probability of each possible word by accessing a stored indication of probability of whether the word occurs in natural language text as a function of adjacent characters; and
submitting the groups of characters determined to be possible words to a parser with an indication of probability.

29. A computer comprising:
computer memory comprising:
instructions to identify individual words occurring in natural language text; and
a word segmentation data structure for use in identifying individual words occurring in natural language text, the data structure having a plurality at records, each record comprising:

a first field including a word; and a second field associated with the first field and including an indication of whether the sequence of characters that comprises the word in the first field may also comprise a series of shorter words, such that, when the word is encountered while word segmenting natural language text, it may be determined with reference to the indication for the word whether to investigate whether the word should be segmented into shorter words; and a processor operable with the computer memory and adapted to process the instructions and the data structure to identify individual words occurring in natural language text.

30. A computer comprising:

computer memory comprising:

instructions to identify individual words occurring in natural language text; and a word segmentation data structure for use in identifying individual words occurring in natural language text, the data structure having a plurality of records, each record comprising:

a first field including a word; and a second field associated with the first field and including an indication of probability of whether the word occurs in natural language text as a function of adjacent characters in the word of the corresponding first field; and a processor operable with the computer memory and adapted to process the instructions and the data structure to identify individual words occurring in natural language text.

31. The computer readable medium of claim 28 wherein ascertaining probability further comprises accessing an associated list of characters for each stored indication of probability.

32. The computer readable medium of claim 28 wherein an indication of probability is low if the word is preceded by one of the characters in a list.

33. The computer readable medium of claim 28 wherein an indication of probability is low if the word is followed by one of the characters in a list.

34. The computer readable medium of claim 28 wherein an indication of probability is zero if the word is preceded by one of the characters in a list.

35. The computer readable medium of claim 28 wherein an indication of probability is zero if the word is followed by one of the characters in a list.

36. The computer readable medium of claim 28 wherein the natural language is Chinese.

37. The method of claim 12, wherein determining that the combination of characters may be a word includes looking up the combination of characters in a list of words comprising words.

38. The method of claim 12 and further comprising:

determining if a word comprises a series of shorter words.

39. The method of claim 38 and further comprising:

setting a probability value for a word based on the determination of whether the word comprises a series of shorter words.

40. The method of claim 12 and further comprising:

setting a probability value for a word based on a possible segmentation of the sequence of natural language characters.

41. The method of claim 12 and further comprising:

determining if the sequence includes overlapping words.

* * * * *